US009648397B2

(12) United States Patent
Lee et al.

(10) Patent No.: US 9,648,397 B2
(45) Date of Patent: May 9, 2017

(54) FUNCTION UPGRADE DEVICE, DISPLAY APPARATUS AND METHOD FOR CONTROLLING DISPLAY APPARATUS THEREOF

(71) Applicant: SAMSUNG ELECTRONICS CO., LTD., Suwon-si (KR)

(72) Inventors: Sang-Il Lee, Seongnam-si (KR); Kun-sok Kang, Yongin-si (KR); Hak-sup Song, Suwon-si (KR); Joo-whan Lee, Seongnam-si (KR); Seong-seol Hong, Yongin-si (KR); Soo-yong Lee, Daejeon (KR); Mi-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/451,561

(22) Filed: Aug. 5, 2014

(65) Prior Publication Data

US 2015/0046968 A1 Feb. 12, 2015

(30) Foreign Application Priority Data

Aug. 6, 2013 (KR) .................. 10-2013-0093201

(51) Int. Cl.
*H04N 21/81* (2011.01)
*H04N 21/418* (2011.01)
(Continued)

(52) U.S. Cl.
CPC ..... *H04N 21/8173* (2013.01); *H04N 21/4183* (2013.01); *H04N 21/4184* (2013.01);
(Continued)

(58) Field of Classification Search
CPC .......... H04N 21/8173; H04N 21/4183; H04N 21/4184
See application file for complete search history.

(56) References Cited

U.S. PATENT DOCUMENTS 8,334,927 B2 * 12/2012 Castano ................ H04N 5/44
348/552
8,514,929 B2 * 8/2013 Erickson ................ H04N 5/76
375/240.01

(Continued)

FOREIGN PATENT DOCUMENTS

KR 10-2001-0106185 A 11/2001
KR 10-0667338 B1 1/2007

OTHER PUBLICATIONS

Search Report dated Nov. 25, 2014, issued by the International Searching Authority in counterpart International Application No. PCT/KR2014/007254.

(Continued)

*Primary Examiner* — Hunter B Lonsberry
*Assistant Examiner* — Alexander Q Huerta
(74) *Attorney, Agent, or Firm* — Sughrue Mion, PLLC

(57) ABSTRACT

A function upgrade device, a display apparatus, and a method for controlling a display apparatus are provided. The function upgrade device may include a function unit configured to perform a function in conjunction with the display apparatus, a storage configured to store user information and an application related to the function unit, an interface configured to connect the function upgrade device to the display apparatus and enable the function upgrade device to communicate with the display apparatus, and a controller configured to, when the display apparatus is connected to the function upgrade device through the interface, control the function unit to operate in conjunction with the display (Continued)

apparatus based on the user information and the application stored in the storage.

20 Claims, 10 Drawing Sheets

(51) Int. Cl.
*H04N 21/45* (2011.01)
*H04N 21/458* (2011.01)
*H04N 21/485* (2011.01)
*H04N 21/443* (2011.01)

(52) U.S. Cl.
CPC ..... *H04N 21/4432* (2013.01); *H04N 21/4516* (2013.01); *H04N 21/4586* (2013.01); *H04N 21/485* (2013.01); *H04N 21/4854* (2013.01); *H04N 21/8166* (2013.01)

(56) References Cited

U.S. PATENT DOCUMENTS

| | | | |
|---|---|---|---|
| 2002/0008779 A1 | 1/2002 | Ju et al. | |
| 2002/0186329 A1* | 12/2002 | Tong | H04N 5/64 348/839 |
| 2004/0030986 A1 | 2/2004 | Matsuda | |
| 2005/0133604 A1* | 6/2005 | Lu | 235/492 |
| 2006/0139364 A1 | 6/2006 | Shin et al. | |
| 2006/0294563 A1* | 12/2006 | Guillorit | 725/108 |
| 2007/0157105 A1 | 7/2007 | Owens et al. | |
| 2007/0266118 A1 | 11/2007 | Wilkins | |
| 2008/0028434 A1* | 1/2008 | Drazin | H04N 5/44543 725/134 |
| 2008/0134237 A1* | 6/2008 | Tu et al. | 725/38 |
| 2008/0148335 A1* | 6/2008 | Dawson | H04N 21/4104 725/132 |
| 2008/0313559 A1 | 12/2008 | Kulus et al. | |
| 2009/0031387 A1* | 1/2009 | Boyden | H04N 5/775 725/132 |
| 2011/0047266 A1* | 2/2011 | Yu | H04L 67/2814 709/224 |
| 2012/0001759 A1* | 1/2012 | Nakada | 340/573.1 |
| 2012/0095302 A1* | 4/2012 | Adhikari | A61B 5/0017 600/301 |
| 2013/0169652 A1* | 7/2013 | Choi | H04N 5/44 345/506 |
| 2013/0174042 A1* | 7/2013 | Kim | G06F 3/048 715/735 |
| 2013/0194302 A1* | 8/2013 | Na | G09G 5/006 345/629 |
| 2013/0258195 A1* | 10/2013 | Chung | H04N 21/4183 348/554 |
| 2013/0263108 A1* | 10/2013 | Chung | G06F 8/65 717/170 |

OTHER PUBLICATIONS

Written Opinion dated Nov. 25, 2014, issued by the International Searching Authority in counterpart International Application No. PCT/KR2014/007254.

* cited by examiner

FIG. 1
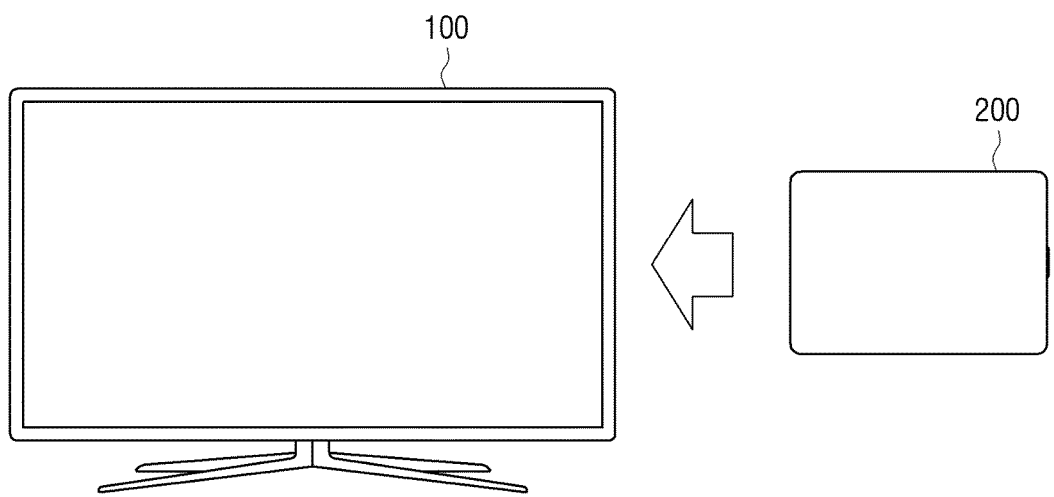
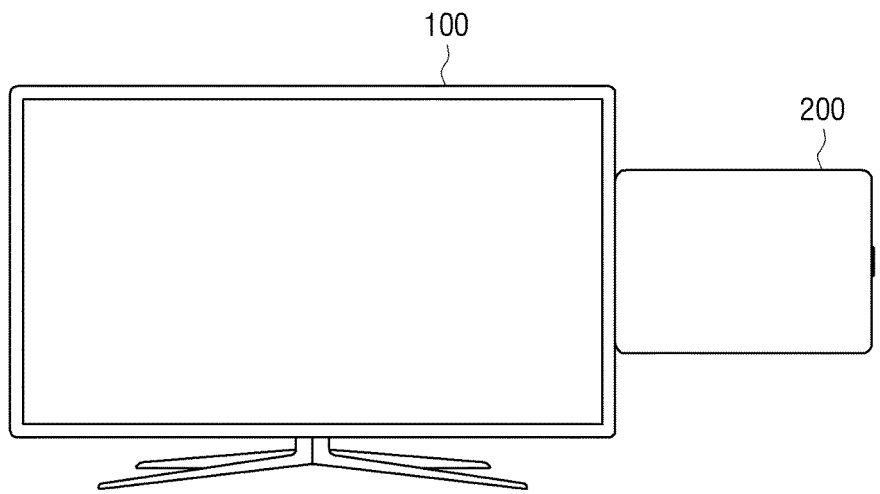

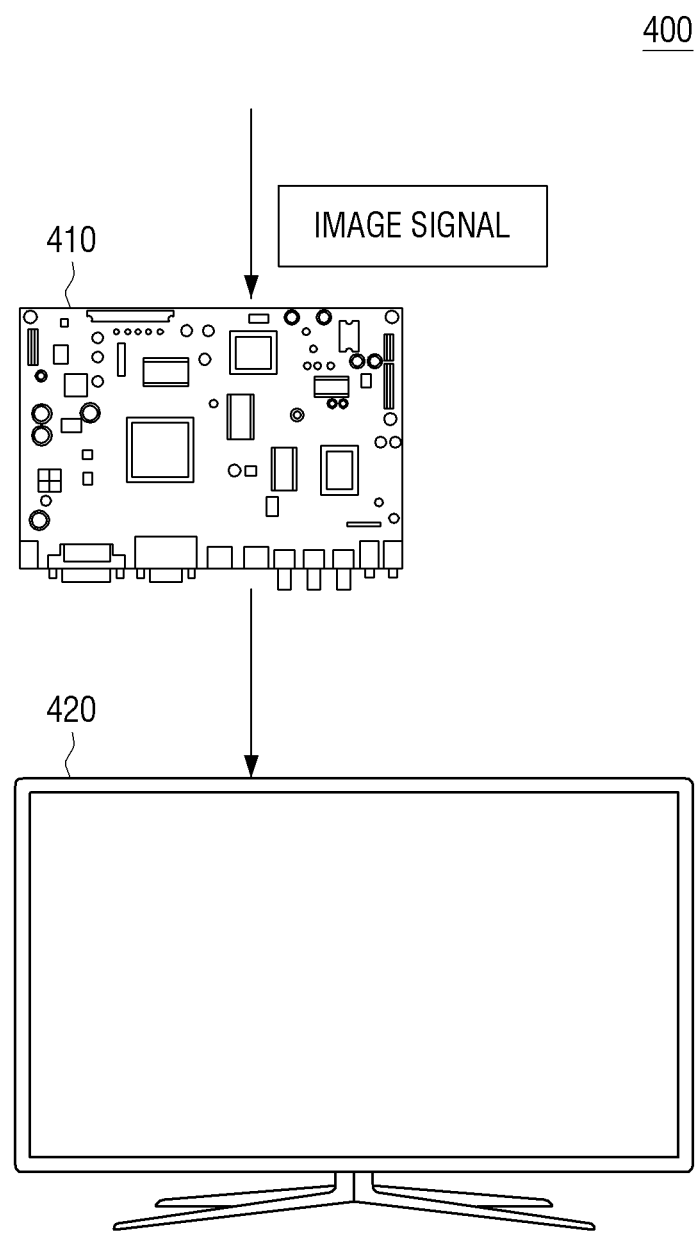

FUNCTION UPGRADE DEVICE, DISPLAY APPARATUS AND METHOD FOR CONTROLLING DISPLAY APPARATUS THEREOF

CROSS-REFERENCE TO RELATED APPLICATION

This application claims priority from Korean Patent Application No. 10-2013-0093201, filed in the Korean Intellectual Property Office on Aug. 6, 2013, the disclosure of which is incorporated herein by reference in its entirety.

BACKGROUND

1. Field

Aspects of the exemplary embodiments relate to a function upgrade device, a display apparatus, and a method for controlling a display apparatus thereof, and more particularly, a function upgrade device capable of further providing additional functions in addition to functions provided by a display apparatus, a display apparatus, and a method for controlling a display apparatus thereof.

2. Description of the Related Art

Recently, display apparatuses have been developed which provide not only a broadcast content providing function but also other various functions, such as an Internet browsing function, an application execution function, a video on demand (VOD) content providing function, and so on.

In order for a display apparatus to provide various functions, the display apparatus should have hardware and software for performing various functions. In other words, according to the conventional art, a user needs to purchase a display apparatus which has the hardware installed and is therefore capable of performing the various functions from the point of purchase to execute the various functions through the display apparatus.

However, a recently developed display apparatus may provide various functions through a function upgrade device which connects to the display apparatus for operations even if such hardware and software are not installed in the display apparatus when the display apparatus is initially purchased. Specifically, when a function upgrade device is connected to a display apparatus, a main board including the function upgrade device performs functions of the display apparatus and thus, the display apparatus may provide more upgraded functions to a user.

In the case of a conventional function upgrade device, a main board of a display apparatus cannot be utilized, and only the functions of upgraded software are provided. As there is no hardware for performing new functions (for example, a graphic processor, an audio processor, etc.) other than the main board, there is a limitation in adding new functions.

In addition, the conventional function upgrade device merely upgrades the functions of a display apparatus, and cannot reflect characteristics of a user who is using the display apparatus.

SUMMARY

Aspects of the exemplary embodiments relate to a function upgrade device capable of changing a setting of a display apparatus based on user information by adding a hardware configuration to the display apparatus so as to provide new functions, a display apparatus, and a controlling method thereof.

According to an aspect of an exemplary embodiment, there is provided a function upgrade device which is connectable to a display apparatus and configured to operate in conjunction with the display apparatus, the function upgrade device including a function unit configured to perform a function in conjunction with the display apparatus, a storage configured to store user information and an application related to the function unit, an interface configured to connect the function upgrade device to the display apparatus and enable the function upgrade device to communicate with the display apparatus, and a controller configured to, when the display apparatus is connected to the function upgrade device through the interface, control the function unit to operate in conjunction with the display apparatus based on the user information and the application stored in the storage.

When the display apparatus is connected to the function upgrade device through the interface and user authentication is performed through the display apparatus, the controller may be configured to control the interface to transmit the user information to the display apparatus.

The user information may include display apparatus setting information, and the display apparatus may be configured to change a setting of the display apparatus according to the display apparatus setting information transmitted from the function upgrade device.

The function to be performed in conjunction with the display apparatus is a game function, and the function unit may include a graphic processor configured to perform the game function.

The function to be performed in conjunction with the display apparatus is a home gateway function, and the function unit may further include a communicator configured to communicate with a home device.

The function to be performed in conjunction with the display apparatus is a 5.1 channel audio output function, and the function unit may include an audio processing module configured to process a 5.1 channel audio signal.

The function to be performed in conjunction with the display apparatus is a health management function, and the function unit may include a sensor and a camera to check a heath condition of a user.

The interface may be implemented as a Universal Serial Bus (USB) interface.

According to another aspect of an exemplary embodiment, there is provided a method for controlling a display apparatus, the method including performing user authentication when a function upgrade device is connected to the display apparatus, in response to authenticating a user based on the performing of the user authentication, receiving user information from the function upgrade device, changing a setting of the display apparatus based on the user information, and in response to receiving a user command to perform a function to be performed by the display apparatus, determining whether the function corresponding to the user command is a function which requires the function upgrade device and generating a result of the determining, and performing the function corresponding to the user command in conjunction with the function upgrade device according to the result.

The performing may include, when the result indicates that the function corresponding to the user command is a function which requires the function upgrade device, performing the function corresponding to the user command in conjunction with the function upgrade device, and when the result indicates that the function corresponding to the user command is not a function which requires the function upgrade device, performing the function corresponding to the user command independently by the display apparatus.

The method may further include receiving a command to download an application, determining whether a function to be performed by the application is a function which requires the function upgrade device and generating a determination result of the determining of whether the function to be performed by the application is a function which requires the function upgrade device, and when the determination result indicates that the function to be performed by the application is a function which requires the function upgrade device, downloading, by the display apparatus, the function and storing the application in the function upgrade device, and when the determination result indicate that the function to be performed by the application is not a function which requires the function upgrade device, downloading, by the display apparatus, the application and storing the application in the display apparatus.

The method may further include transmitting, by the display apparatus, a usage history information of a user with respect to the display apparatus to the function upgrade device, and storing, by the function upgrade device, the usage history information.

The display apparatus and the function upgrade device may be connected to each other through a Universal Serial Bus (USB) interface.

According to another aspect of an exemplary embodiment, there is provided a display apparatus including a function unit configured to perform a function of the display apparatus, an interface configured to connect the display apparatus to a function upgrade device and enable the display apparatus to communicate with the function upgrade device, and a controller configured to, when the function upgrade device is connected through the interface, control the function unit to receive user information from the function upgrade device by performing user authentication and change a setting of the display apparatus based on the user information, and when a user command to perform a function of the display apparatus is input, control the function unit to make a determination as to whether the function corresponding to the user command is a function which requires the function upgrade device and perform the function corresponding to the user command in conjunction with the function upgrade device according to the determination.

When the determination result indicates that the function corresponding to the user command is a function which requires the function upgrade device, the controller may control the display apparatus to perform the function corresponding to the user command in conjunction with the function upgrade device, and when the determination indicates that the function corresponding to the user command is not a function which requires the function upgrade device, the controller controls the display apparatus to perform the function corresponding to the user command independently.

The apparatus may further include an input configured to receive user commands and a storage, and when a command to download an application is input through the input, the controller may be configured to determine whether a function to be performed by the application is a function which requires the function upgrade device, and when the controller determines that the function to be performed by the application is a function which requires the function upgrade device, the controller may download and store the application in the function upgrade device, and when the controller determines that the function to be performed by the appli- cation is not a function which requires the function upgrade device, the controller may download and store the application in the storage.

The controller may be configured to control the interface to transmit a usage history information of a user with respect to the display apparatus to the function upgrade device, and the function upgrade device may be configured to store the usage history information.

The interface may be a Universal Serial Bus (USB) interface.

BRIEF DESCRIPTION OF THE DRAWINGS

The above and/or other aspects of the exemplary embodiments will be more apparent by describing certain exemplary embodiments with reference to the accompanying drawings, in which:

FIG. 1 is a view illustrating a display system according to an exemplary embodiment;

FIGS. 4A to 4C are views provided to explain a related art technique and a process of outputting an image signal according an exemplary embodiment;

DETAILED DESCRIPTION

Figure 2:
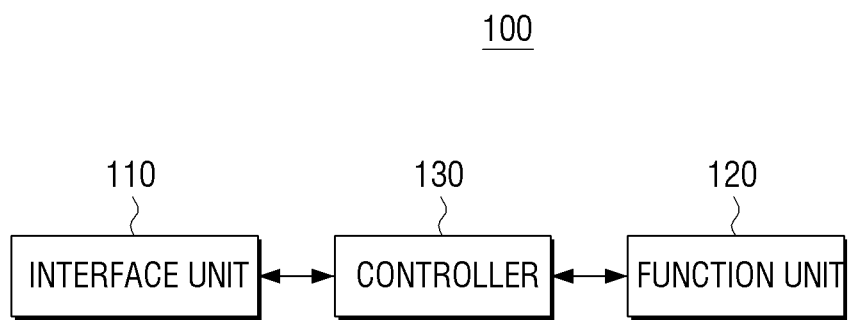
FIG. 2 is a block diagram illustrating a configuration of certain elements of a display apparatus according to an exemplary embodiment.

It should be noted that the method operations and system components are represented by symbols in the figures, showing only specific details which are relevant for an understanding of the exemplary embodiments. Further, details which may be readily apparent to a person having ordinary skill in the art may not have been disclosed. In the present disclosure, relational terms such as first and second, and the like, may be used to distinguish one entity from another entity, without necessarily implying any actual relationship or order between such entities.

FIG. 1 is a view illustrating a display system 10 according to an exemplary embodiment. As illustrated in FIG. 1, the display system 10 includes a display apparatus 100 and a function expansion apparatus 200. According to an exemplary embodiment, the display apparatus 100 may be realized as a smart television as illustrated in FIG. 1, but this is only an example. Alternatively, the display apparatus may be realized as various types of apparatuses other than a smart television, such as a projector television, a monitor, a tablet, a mobile phone, and so on.

The display apparatus 100 performs general functions such as a broadcast reception function, a content reproduction function, etc. according to a user command.

The function expansion apparatus 200 may be realized as an apparatus which is separate from the display apparatus 100 as illustrated in (a) of FIG. 1, or may be connected to the display apparatus 100 through a wired interface (for example, a USB interface) as illustrated in (b) of FIG. 1.

According to an exemplary embodiment, the function expansion apparatus 200 may include a function unit which is a hardware configuration configured to provide a new function other than functions which can be provided by the display apparatus 100. For example, in order to provide a gaming function, the function expansion apparatus 200 may include a graphic processing unit which may provide a high-performance graphic processing function.

In addition, the function expansion apparatus 100 may store an application to provide a new function. According to an exemplary embodiment, the application may be an application which is related to the function unit to provide a new function. For example, if a function unit to provide a health check-up function is included in the function expansion apparatus 200, the function expansion apparatus 200 may include a health check-up application to control the function unit to provide a health check-up function.

Further, in order to provide a personalized function, the function expansion apparatus 100 may store user information. Specifically, the function expansion apparatus 200 may include user authentication information, display apparatus setting information which is preferred by a user (for example, preferred channel information), user usage history information, and so on.

According to an exemplary embodiment, if the function expansion apparatus 200 is connected to the display apparatus 100 via an interface unit, the display apparatus 100 performs user authentication by using user authentication information stored in the function expansion apparatus 200. In this case, the display apparatus 100 may authenticate a user by using an ID/pin number, but this is only an example. Alternatively, the display apparatus 100 may recognize a user by using various other types of recognition methods, such as face recognition, fingerprint recognition, and so on.

In response to the user authentication being successfully performed, the display apparatus 100 may receive user information from the function expansion apparatus 200. Specifically, the display apparatus 100 may receive various display apparatus setting information which is preferred by a user from the function expansion apparatus 200, such as preferred channel information, preferred image setting information, preferred audio setting information, and so on.

Subsequently, the display apparatus 100 may change the setting of the display apparatus 100 based on the received user information. Specifically, for example, the display apparatus 100 may change preferred channel information of the display apparatus 100 by using preferred channel information received from the display apparatus 100. In addition, the display apparatus 100 may change other types of settings, such as the image setting or audio setting of the display apparatus 100, based on received image or audio setting information.

If a user command to perform a function of the display apparatus 100 is input, the display apparatus 100 may determine whether a function corresponding to the user command is a function which requires a function expansion apparatus and perform a function corresponding to the user command. Specifically, if it is determined that a function corresponding to the user command is a function which requires the function expansion apparatus 200, the display apparatus 100 may perform the function corresponding to the user command in conjunction with the function expansion apparatus 200. If it is determined that a function corresponding to the user command is not a function which requires the function expansion apparatus 200, the display apparatus 100 may perform the function corresponding to the user command independently.

In addition, if a download command with respect to a specific application is received, the display apparatus 100 may determine whether the function of executing the specific application requires the function expansion apparatus 200. If it is determined that the function of executing the specific application requires the function expansion apparatus 200, the display apparatus 100 may download the specific application and store the application in the function expansion apparatus 200. If it is determined that the function of executing the specific application does not require the function expansion apparatus 200, the display apparatus 100 may download the specific application and store the application in the display apparatus 100.

In addition, if the function expansion apparatus 200 is connected to the display apparatus 100, the display apparatus 100 may not store information regarding usage history of the display apparatus 100 in the display apparatus 100 and instead, may transmit the information to the function expansion apparatus 200. In this case, the function expansion apparatus 200 may store the information regarding the usage history of the display apparatus.

As described above, by using the display system 10, a user may perform not only general functions but also new functions of the display apparatus 100 more easily and conveniently, and may be provided with a usage environment including a personalized display apparatus at any point in time.

Hereinafter, the display apparatus 100 will be explained with reference to FIGS. 2 to 4C. FIG. 2 is a block diagram illustrating a configuration of certain elements of the display apparatus 100 according to an exemplary embodiment. As illustrated in FIG. 2, the display apparatus 100 includes an interface unit 110, a function unit 120, and a controller 130.

The interface unit 110 may be connected to the function expansion apparatus 200 and receive and/or transmit various types of data so that the display apparatus 100 may perform a function in conjunction with the function expansion apparatus 200. According to an exemplary embodiment, the interface unit 110 may be a Universal Serial Bus (USB), but is not limited thereto. The interface unit 110 may be realized as various types of wired or wireless interfaces, such as a serial interface.

In addition, the interface unit 110 may include not only an interface which connects a main board of the display apparatus 100 and a main board of the function expansion apparatus 200 but also an interface which connects a display of the display apparatus 100 and a controller of the function expansion apparatus 200.

The function unit 120 is an element configured to perform general functions of the display apparatus 100. Specifically, the function unit 120 may include various elements such as an image processor configured to process an input image, an image output unit configured to output an input image, an audio processor configured to process input audio, an audio output unit configured to output input audio, a communicator configured to perform communication with the outside, and so on.

The controller 130 controls overall operations of the display apparatus 100. In particular, if the function expansion apparatus 200 is connected via the interface unit 110, the display apparatus 100 may control the interface unit 110 to perform user authentication and receive user information from the function expansion apparatus 200. Specifically, if the function expansion apparatus 200 is connected via the interface unit 110, the display apparatus 100 may receive user authentication information from the function expansion apparatus 200, and may perform user authentication based on the received user authentication information. According to an exemplary embodiment, the display apparatus 100 may perform user authentication using various recognition methods such as ID/pin number authentication, fingerprint recognition, face recognition, voice recognition, and so on. When authentication is successfully performed, the display apparatus 100 may control the interface unit 110 to receive user preferred setting information, application information, etc. from the function expansion apparatus 200.

In addition, the display apparatus 100 may change the settings of the display apparatus 100 based on user information such as received user preferred setting information and so on. Specifically, the display apparatus 100 may change the preferred channel, image setting, audio setting, etc. of the display apparatus 100 based on the user preferred setting information received from the function expansion apparatus 200.

Further, if a user command to perform a function of the display apparatus 100 is input, the controller 130 may control the function unit 120 to determine whether the function corresponding to the user command is a function which requires the function expansion apparatus 200, and may perform the function corresponding to the user command.

Specifically, if it is determined that the function corresponding to the user command is a function which requires the function expansion apparatus 200, the controller 130 may perform the function corresponding to the user command in conjunction with the function expansion apparatus 200. For example, if the function corresponding to the user command is a multi-channel audio reproduction function which requires the function expansion apparatus 200, the controller 130 may reproduce multi-channel audio by interlocking an audio processing module of the function expansion apparatus 200 with an audio output element of the display apparatus 100.

However, if it is determined that the function corresponding to the user command is not a function which requires the function expansion apparatus 200, the controller 130 may cause the display apparatus to perform the function corresponding to the user command independently. For example, if the function corresponding to the user command is a broadcast content reproduction function, the controller 130 may receive broadcast content through a tuner of the display apparatus 100, and display the received broadcast content through a display of the display apparatus 100.

That is, in the related art technique, if a function expansion apparatus is connected to a display apparatus, the controller of the function expansion apparatus performed various functions instead of the controller of the display apparatus performing the various functions, whereas according to an exemplary embodiment, the function corresponding to a user command may be performed by different elements depending on whether the function requires the function expansion apparatus 200.

In addition, if a download command with respect to a specific application is input, the controller 130 may determine whether the function performed by the specific application is a function which requires the function expansion apparatus 200, and may store the specific application based on the result of the determination.

Specifically, if the function performed by the specific application is a function which requires the function expansion apparatus 200, the controller 130 may download the specific application and store the application in the function expansion apparatus 200. For example, if the specific application is a health check-up application which requires the function unit of the function expansion apparatus 200, the controller 130 may store the health check-up application in the function expansion apparatus 200 instead of storing the health check-up application in the display apparatus 100.

Alternatively, if the function performed by the specific application is not a function which requires the function expansion apparatus 200, the controller 130 may download the specific application and store the application in the display apparatus 100. For example, if the specific application is a video on demand (VOD) application, the controller 130 may download the VOD application and store the application in the storage of the display apparatus 100.

As described above, according to an exemplary embodiment, in the case of an application which requires the function expansion apparatus 200 to perform a function, the application is stored in the function expansion apparatus 200 instead of being stored in the display apparatus 100. As a result, when the function expansion apparatus 200 is connected to another display apparatus 100, a user may perform a function by using the application stored in the function expansion apparatus 200 without downloading the same application from the another display apparatus 100.

Further, the controller 130 may control the interface unit 100 to transmit usage history information of the display apparatus 100 indicating a usage history of a user while the function expansion apparatus 200 is connected to the display apparatus 100, to the function expansion apparatus 200, instead of storing the information in the display apparatus 100. According to an exemplary embodiment, the function expansion apparatus 200 may store usage history information regarding the display apparatus 100.

As described above, by storing usage history information of the display apparatus 100 in the function expansion apparatus 200, a user may be provided with a personalized service (for example, a content recommendation service) through the function expansion apparatus 200.

Figure 3:
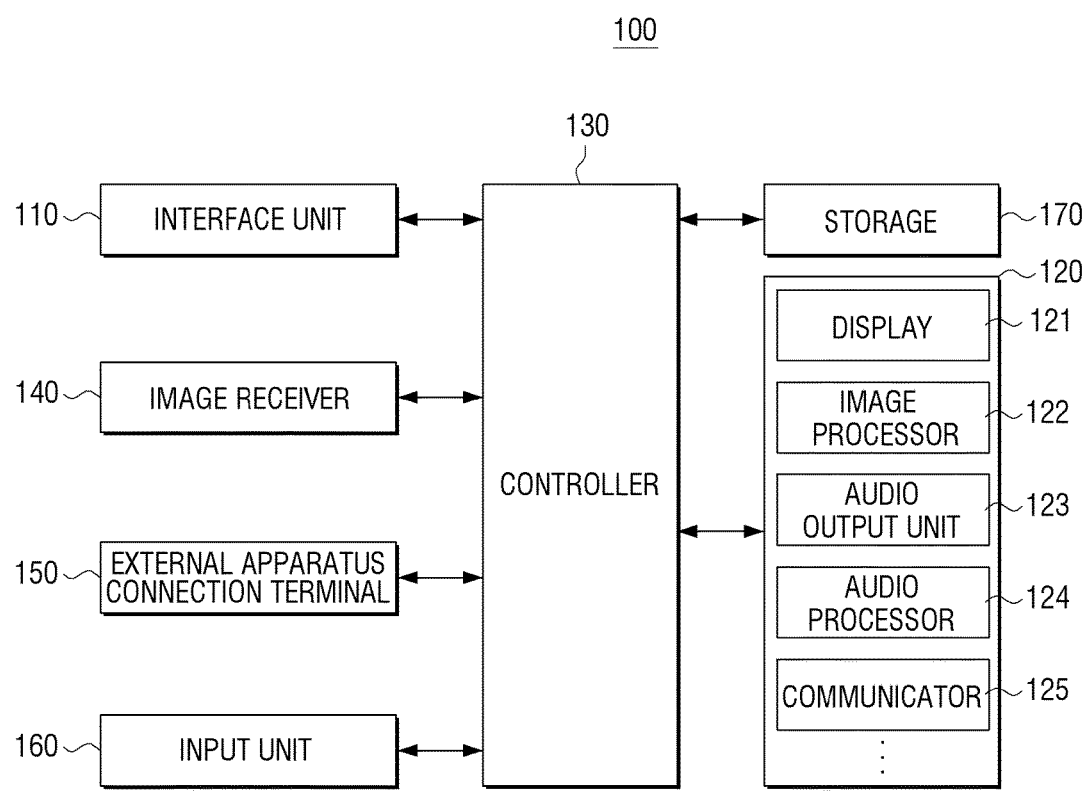
FIG. 3 is a block diagram illustrating a configuration of a display apparatus in detail according to another exemplary embodiment.

FIG. 3 is a block diagram illustrating a configuration of the display apparatus 100 in detail according to another exemplary embodiment. As illustrated in FIG. 3, the display apparatus 100 includes an interface unit 110, an image receiver 140, an external apparatus connection terminal 150, an input unit 160 (e.g., input), a storage 170, a function unit 120, and a controller 130.

The interface unit 110 is connected to the function expansion apparatus 200 in order to transmit and/or receive data to and/or from the function expansion apparatus 200. In particular, the interface unit 110 may receive various types of data (for example, user information, applications, etc.) stored in the function expansion apparatus 200 from the function expansion apparatus 200, and may transmit various types of data such as usage history information of the display apparatus 100 to the function expansion apparatus 200.

According to an exemplary embodiment, the interface unit 110 may be realized as a USB interface, but this is only an example. The interface unit 110 may be realized as various types of interfaces, such as a serial interface and so on.

The image receiver 140 receives an image from various sources. For example, the image receiver 140 may receive broadcast content from an external broadcasting station, may receive image content from an external apparatus, and may receive content transmitted over a network such as the Internet.

The external apparatus connection terminal 150 may be connected to an external apparatus in order to communicate with the external apparatus. According to an exemplary embodiment, the external apparatus connection terminal 150 may be realized as various types of terminals, such as an HDMI connection terminal, an S-VIDEO connection terminal, and so on.

The input unit 160 receives various types of user commands to control the display apparatus 100. According to an exemplary embodiment, the input unit 160 may be realized as a remote controller, but this is only an example. The input unit 160 may also be realized as various other types of input apparatuses such as a keyboard, a mouse, a pointing device, a mobile phone having an application stored thereon which enables the mobile phone to control a display apparatus, and so on.

The storage 170 stores various types of data and programs to control the display apparatus 100. In particular, the storage 170 may store application data to perform a function of the display apparatus 100. According to an exemplary embodiment, the application data stored in the storage 170 may be application data to perform a function which does not require the external function expansion apparatus 200.

The function unit 120 performs overall functions of the display apparatus 100. According to an exemplary embodiment, the function unit 120 includes a display 121, an image processor 122, an audio output unit 123, an audio processor 124, a communicator 125, etc. as illustrated in FIG. 3.

The display 121 displays at least one of a video frame which is generated as the image processor 122 processes image data received from the image receiver 140 and various screens which are generated by a graphic processor.

The image processor 122 is an element which processes image data received from the image receiver 140. The image processor 122 may perform various types of processing including decoding, scaling, noise filtering, frame rate conversion, and resolution conversion with respect to image data.

The audio output unit 123 is an element which outputs not only various audio data processed by the audio processor 124 but also various alarming sounds or audio messages.

The audio processor 124 is an element which processes audio data. The audio processor 124 may perform various processing operations including decoding, amplification, and noise filtering with respect to audio data. The audio data processed by the audio processor 124 may be output to the audio output unit 123.

The communicator 125 communicates with various types of external apparatuses according to various types of communication methods. In particular, the communicator 125 may include various communication chips such as a WiFi chip, a Bluetooth chip, a near field communication (NFC) chip, a wireless communication chip, and so on. When the WiFi chip or the Bluetooth chip is used, various types of connection information, such as, for example, an SSID, session key, etc. is received or transmitted in advance so that various types of information can be received or transmitted using the same. The wireless communication chip refers to a chip which performs communication according to at least one communication standard among various communication standards such as IEEE, Zigbee, 3G (3rd Generation), 3GPP (3rd Generation Partnership Project), LTE (Long Term Evolution), and so on.

The controller 130 controls overall functions of the display apparatus 100 according to a user command input through the input unit 160. In particular, when the function upgrade device 200 is connected through the interface unit 110, the controller 130 may receive user information from the function upgrade device 200 by performing user authentication and may change the setting of the display apparatus 100 based on the user information.

Specifically, if the function upgrade device 200 is connected through the interface unit 110, the controller 130 may receive user authentication information from the function upgrade device 200. According to an exemplary embodiment, the user authentication information may include a user ID and pin number. The controller 130 may control the display 121 to display a user interface (UI) which enables a user to input an ID and pin number for user authentication. If an ID and pin number designated by a user are input through the UI, the controller 130 may perform user authentication. Of course, performing user authentication using an ID and pin number as described above is only an example, and user authentication may be performed by using various other recognition methods such as fingerprint recognition, face recognition, voice recognition, iris recognition, and so on.

When user authentication is performed, the controller 130 may control the user interface unit 110 to receive user information from the function upgrade device 200. According to an exemplary embodiment, the received user information may include a user's preferred channel information, a user's preferred image setting information, a user's preferred audio setting information, information on an application installed in the function upgrade device 200, a user's display apparatus usage history, etc. but is not limited thereto.

When the user information is received, the controller 130 may change the settings of the display apparatus 100 according to the received information. For example, the controller 130 may change preferred channel information of the display apparatus 100 based on a user's preferred channel information. In another example, the controller 130 may change the image setting value and the audio setting value of the display apparatus based on a user's preferred image information and preferred audio information. Accordingly, the user may store his or her preferred display apparatus setting information in the function upgrade device 200. Thus, according to exemplary embodiments, the user may change the settings of the display apparatus 100 according to the user's preferences in an easy and convenient fashion by using the function upgrade device 200.

If a user command to perform a function of the display apparatus 100 is input through the input unit 160, the controller 130 may control the function unit 120 to perform the function corresponding to the user command by determining whether the function corresponding to the user command requires the function upgrade device 200.

Figure 4B:
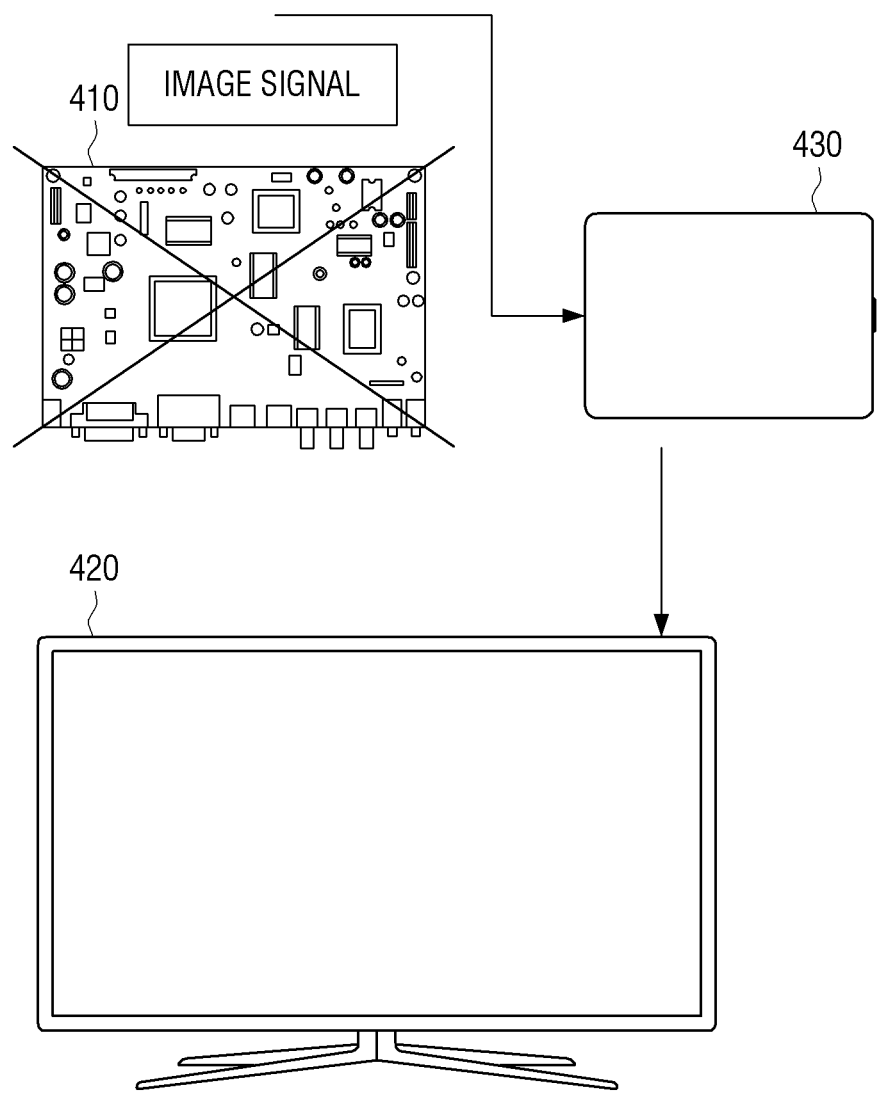

Specifically, if the function upgrade device 200 is not connected, a general display apparatus 200 may perform image processing with respect to an image signal by using an image processor 410 and output an output image signal to a display 420, as exemplarily illustrated in FIG. 4A. In addition, conventionally, if the function upgrade device 200 is connected, the conventional display apparatus 400 does not process an image signal using the image processor 410 of the display apparatus 400 and instead, outputs an output image signal to the display 420 after processing the image signal by using a function upgrade device 430. That is, conventionally, if the function upgrade device 430 is connected to the display apparatus 400, the element of the function upgrade device 430 is used instead of the element of the display apparatus 400.

Figure 4C:
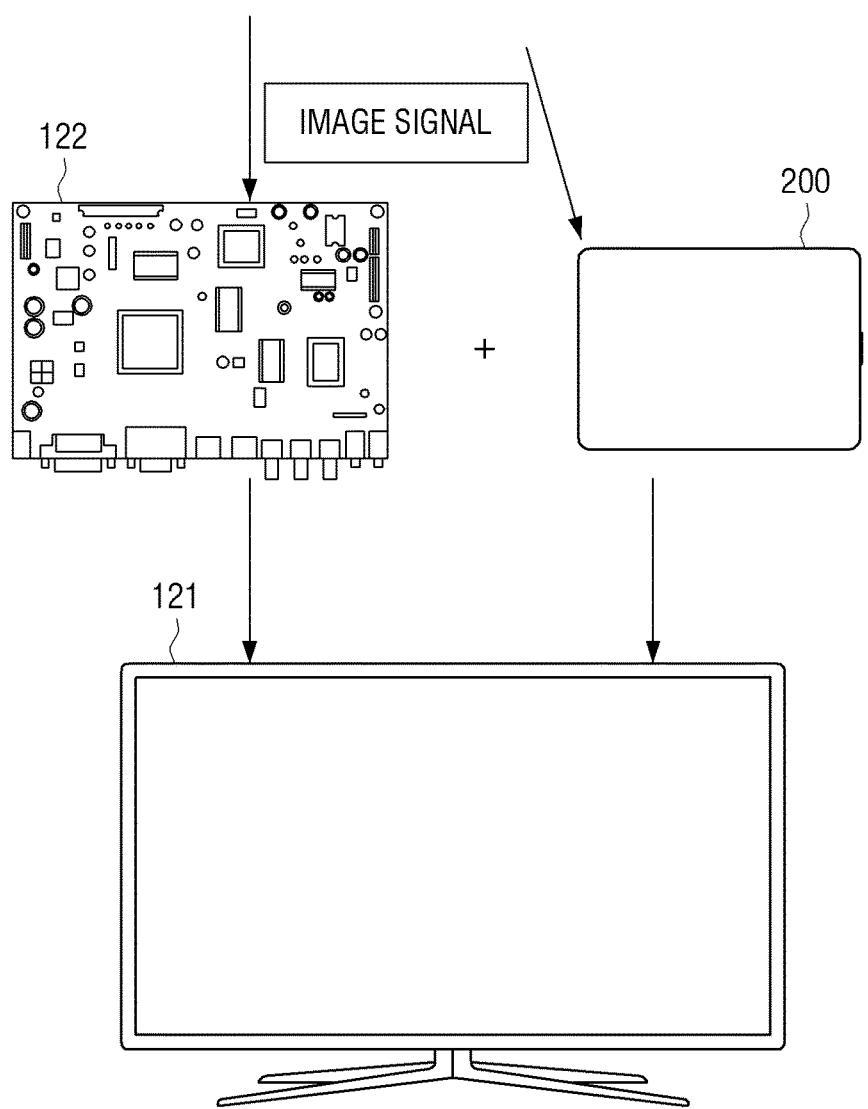

In contrast, according to an exemplary embodiment, the controller 130 may perform image processing using one of the image processor 122 of the display apparatus 100 and an image processing unit of the function upgrade device 200 depending on whether a received image requires the function upgrade device 200, as exemplarily illustrated in FIG. 4C. Specifically, if an input image is an image which requires the function upgrade device 200, the controller 130 may process the image using a graphic processing unit of the function upgrade device 200 and output the processed image to the display 121 of the display apparatus 100. If an input image is an image which does not require the function upgrade device 200, the controller 130 may process the input image through the image processor 122 and output the processed image to the display 121.

That is, if a function corresponding to a user command is a function which requires the function upgrade device 200, the controller 130 may control the function unit 120 to perform the function corresponding to the user command in conjunction with the function upgrade device 200. If a function corresponding to a user command is not a function which requires the function upgrade device 200, the controller 130 may control the function unit 120 such that the display apparatus 100 performs the function corresponding to the user command independently.

In addition, the controller 130 may store a specific application in a different location depending on whether the specific application for which a download command is input requires the function upgrade device 200. Specifically, if a function performed by the specific application requires the function upgrade device 200, the controller 130 may control the interface unit 110 to transmit the specific application to the function upgrade device 200 in order to enable the function upgrade device 200 to download the specific application and store the specific application in a storage of the function upgrade device 200. If a function performed by the specific application is not a function which requires the function upgrade device 200, the controller 130 may download the specific application and store the specific application in the storage 170.

In addition, in order to store usage history information of the display apparatus 100 in the function upgrade device 200, the controller 130 may control the interface unit 110 to transmit usage history information of the display apparatus 100 to the function upgrade device 200. Specifically, the controller 130 may control the interface unit 11 to transmit usage history information of the display apparatus 100, such as information regarding broadcast contents watched by a user, web address information searched for by a user, information on VODs reproduced by a user, information on applications executed by a user, etc. to the function upgrade device 200.

As described above, by transmitting usage history information of a display apparatus, a user may be provided with various types of services (such as, for example, a content recommendation service, a content continuous play service, etc.) based on the usage history information of the display apparatus, even if the function upgrade device 200 is connected to another display apparatus later.

Figure 5:
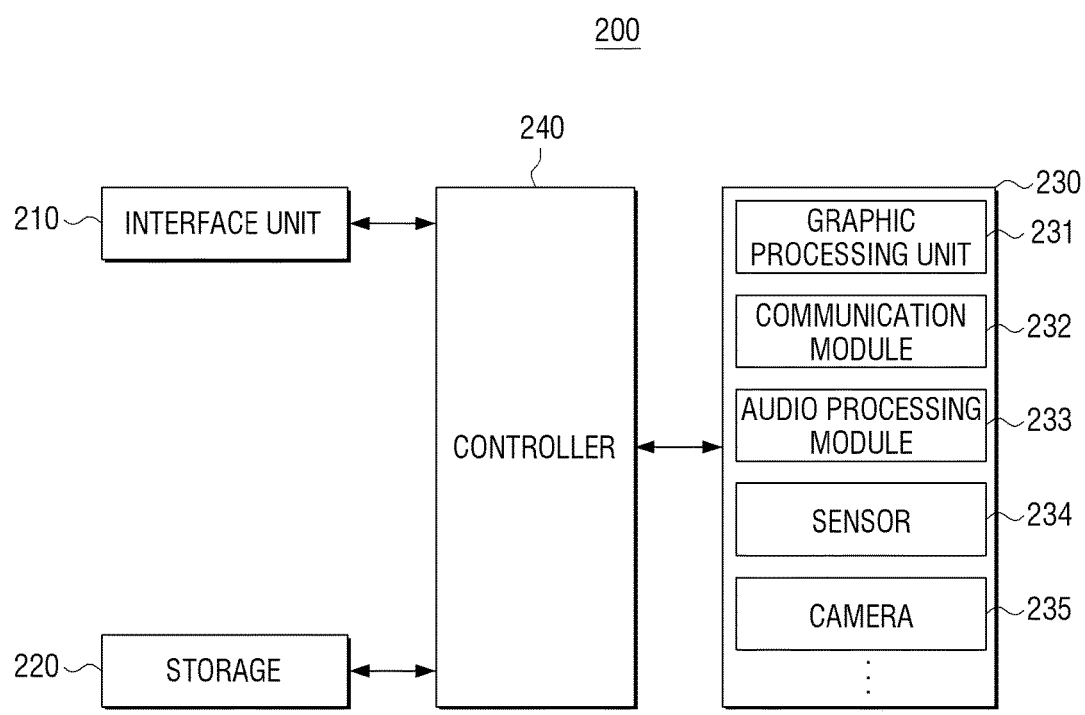
FIG. 5 is a block diagram illustrating a configuration of a function upgrade device according to an exemplary embodiment.

FIG. 5 is a block diagram illustrating a configuration of the function upgrade device 200 according to an exemplary embodiment. As illustrated in FIG. 5, the function upgrade device 200 includes an interface unit 210 (e.g., interface 210), a storage 220, a function unit 230, and a controller 240.

One or several of the components including the interface unit 210, the storage 220, the function unit 230 and the controller 240 may be implemented to include various types of hardware, including, for example, processors, to perform the corresponding functions.

The interface unit 210 may be connected to the display apparatus 100 and may transmit or receive various data so that the display apparatus 100 and the function upgrade device 200 may perform functions in conjunction with each other. According to an exemplary embodiment, the interface unit 210 may be a Universal Serial Bus (USB) interface, but is not limited thereto. The interface unit 210 may be realized as various types of wired or wireless interfaces, such as a serial interface.

In addition, the interface 210 may include not only an interface which connects a main board of the display apparatus 100 and a main board of the function upgrade device 200, but also an interface which connects a display unit of the display apparatus 100 and the controller 240 of a function upgrade device.

The storage 220 stores various programs and data to control the function upgrade device 200. In particular, the storage 220 may store various applications to control the function unit 230 of the function upgrade device 200. In addition, the storage 230 may include user information, such as, for example, user authentication information, a user's preferred display apparatus setting information, and so on.

The function unit 230 includes an element to provide various functions in conjunction with the display apparatus 100. According to an exemplary embodiment, hardware included in the function unit 230 may be hardware configured to perform functions which cannot be provided by a conventional display apparatus 100.

For example, if a function which is performed in conjunction with the display apparatus 100 is a game function, the function unit 230 may include a graphic processing unit 231 (e.g., graphic processor) to perform the game function. In addition, if a function which is performed in conjunction with the display apparatus 100 is a home gateway function, the function unit 230 may include a communication module 232 (e.g., communicator) which may perform communication with other home devices. Further, if a function which is performed in conjunction with the display apparatus 100 is a 5.1 channel audio output function, the function unit 230 may include an audio processing module 233 which may process input audio to a 5.1 channel audio signal which may be output. In addition, if a function which is performed in conjunction with the display apparatus 100 is a health management function, the function unit 230 may include a sensor 234 and a camera 235 to check a user's health condition.

The controller 240 may control overall operations of the function upgrade device 200. Specifically, if the display apparatus 100 is connected through the interface unit 210, the controller 240 may control the function unit 230 to operate in conjunction with the display apparatus 100 based on user information and an application stored in the storage 220.

In addition, if the display apparatus 100 is connected through the interface unit 210 and then user authentication is performed through the display apparatus 100, the controller 240 may control the interface unit 210 to transmit user information to the display apparatus 100. Specifically, when the display apparatus 100 is connected through the interface unit 210, the controller 240 may control the interface unit 210 to transmit user authentication information stored in the storage 220 to the display apparatus 100. If a signal indicating that a user is authenticated based on user authentication information is received from the display apparatus 100, the controller 240 may control the interface unit 210 to transmit user information such as a user's display apparatus setting information stored in the storage 220 to the display apparatus 100. If user information such as a user's display apparatus setting information is transmitted to the display apparatus 100, the display apparatus 100 may change the setting of the display apparatus 100 based on display apparatus setting information of the display apparatus 100.

As described above, by changing the settings of the display apparatus 100 based on user information stored in the function upgrade device 200, a user may be provided with personalized services (for example, a setting change service) through the display apparatus 100 by using the function upgrade device 200.

In addition, if a user command to execute a function which requires the function unit 230 of the function upgrade device 200 is input from the display apparatus 100, the controller 240 may control the function unit 230 based on an application stored in the storage 220. For example, if a command to execute a game which requires the function upgrade device 200 is received from the display apparatus 100 through the interface unit 210, the controller 240 may control the interface unit 210 to process a game image using the graphic processing unit 231 and using a game application stored in the storage 220 and output the processed game image to the display apparatus 100.

In addition, the controller 240 may control the interface unit 210 to receive a user's display apparatus usage history information from the display apparatus 100.

Figure 6:
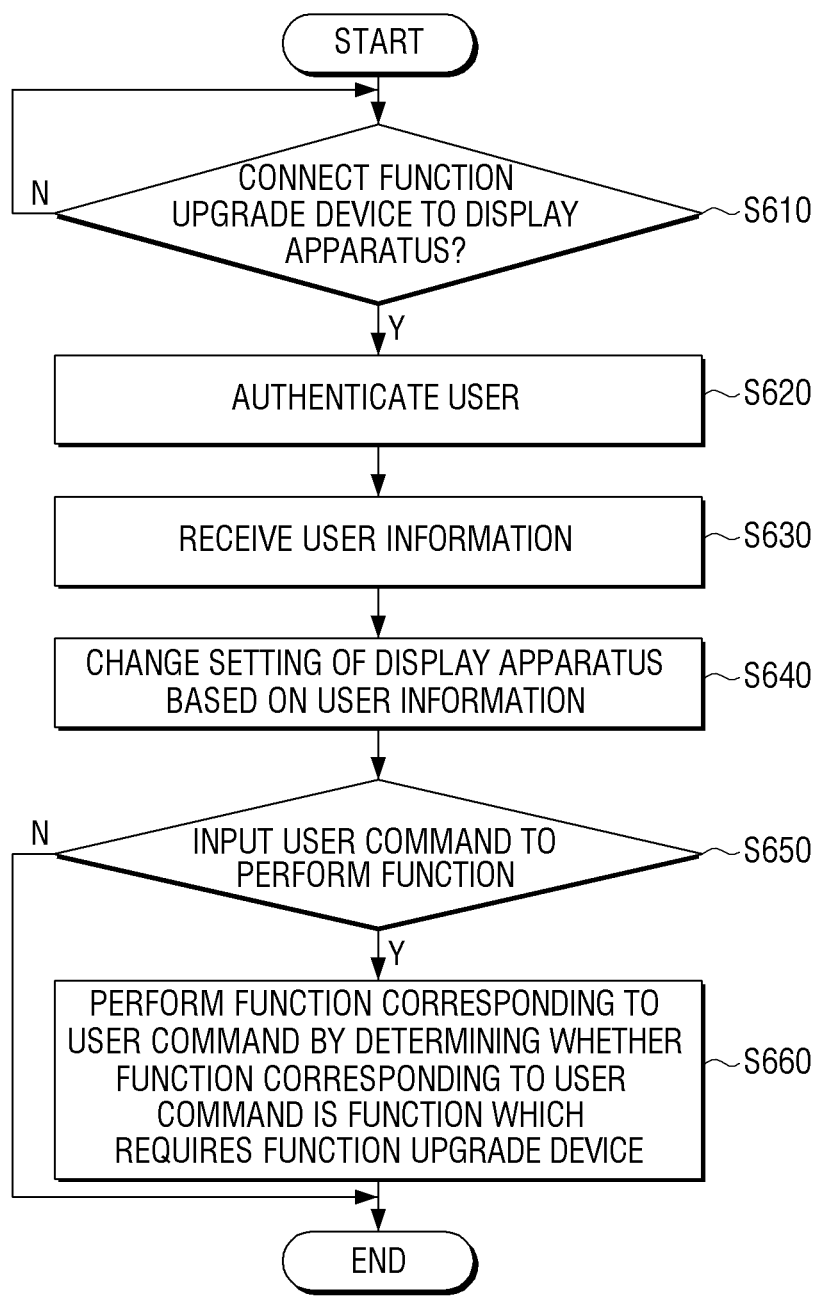
FIG. 6 is a flowchart provided to explain a method for controlling a display apparatus according to an exemplary embodiment.

FIG. 6 is a flowchart provided to explain a method for controlling a display apparatus according to an exemplary embodiment.

First, the display apparatus 100 determines whether the function upgrade device 200 is connected to the display apparatus 100 at operation S610. According to an exemplary embodiment, the display apparatus 100 and the function upgrade device 200 may be connected to each other through an interface module such as a USB interface.

In response to determining that the function upgrade device 200 is connected to the display apparatus (operation S610-Y), the display apparatus 100 authenticates a user at operation S620. Specifically, after the function upgrade device 200 is connected, the display apparatus 100 receives user authentication information from the function upgrade device 200. Subsequently, the display apparatus 100 may perform an authentication process based on the user authentication information. According to an exemplary embodiment, the user authentication information may be an ID and/or pin number, but this is only an example. The user authentication information may also be many other types of authentication information, such as, for example, user fingerprint information, user face information, user iris information, user voice information, a combination thereof, and so on.

The display apparatus 100 receives user information from the function upgrade device 200 at operation S630. In this case, the user information may be setting information of the display apparatus 100 indicating settings which are preferred by a user.

The display apparatus 100 changes the setting of the display apparatus 100 based on the user information at operation S640. Specifically, the display apparatus 100 may change a preferred channel, an image setting value, an audio setting value, etc. of the display apparatus 100 based on the user information.

Subsequently, the display apparatus 100 determines whether a user command to perform a function is input at operation S650.

In response to determining that a user command to perform a function is input (operation S650-Y), the display apparatus 100 determines whether a function corresponding to the user command is a function which requires the function upgrade device 200 and performs the function corresponding to the user command at operation S660. The method for performing a function according to whether the function corresponding to a user command is a function that requires the function upgrade device 200 will be explained with reference to FIG. 7.

Figure 7:
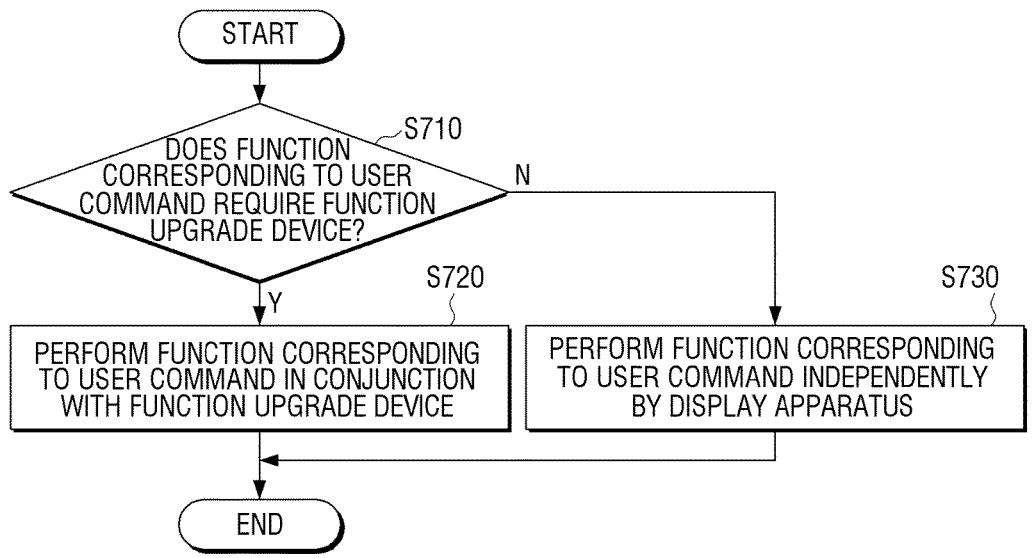
FIG. 7 is a flowchart provided to explain a method for performing a function by a display apparatus when a function upgrade device is installed in the display apparatus according to another exemplary embodiment.

Specifically, as shown in FIG. 7, first, the display apparatus 100 determines whether a function corresponding to a user command is a function which requires the function upgrade device 200 at operation S710.

In response to determining that a function corresponding to a user command is a function which requires the function upgrade device 200 (operation S710-Y), the display apparatus 100 performs the function corresponding to the user command in conjunction with the function upgrade device at operation S720. For example, if a function corresponding to a user command is a health management function which requires the function upgrade device 200, the display apparatus 100 may receive a user's health information which the function upgrade device 200 has obtained by using the sensor 234 and the camera 235 and output the health information through the display unit 121.

However, if a function corresponding to a user command is not a function which requires the function upgrade device 200 (operation S710-N), the display apparatus 100 performs the function corresponding to the user command independently at operation S730. For example, if a function corresponding to a user command is a broadcast content reproduction function, the display apparatus 100 may receive broadcast content through a tuner of the display apparatus 100 and display the received broadcast content through the display 121 of the display apparatus 100, independently of the function upgrade device 200.

Figure 8:
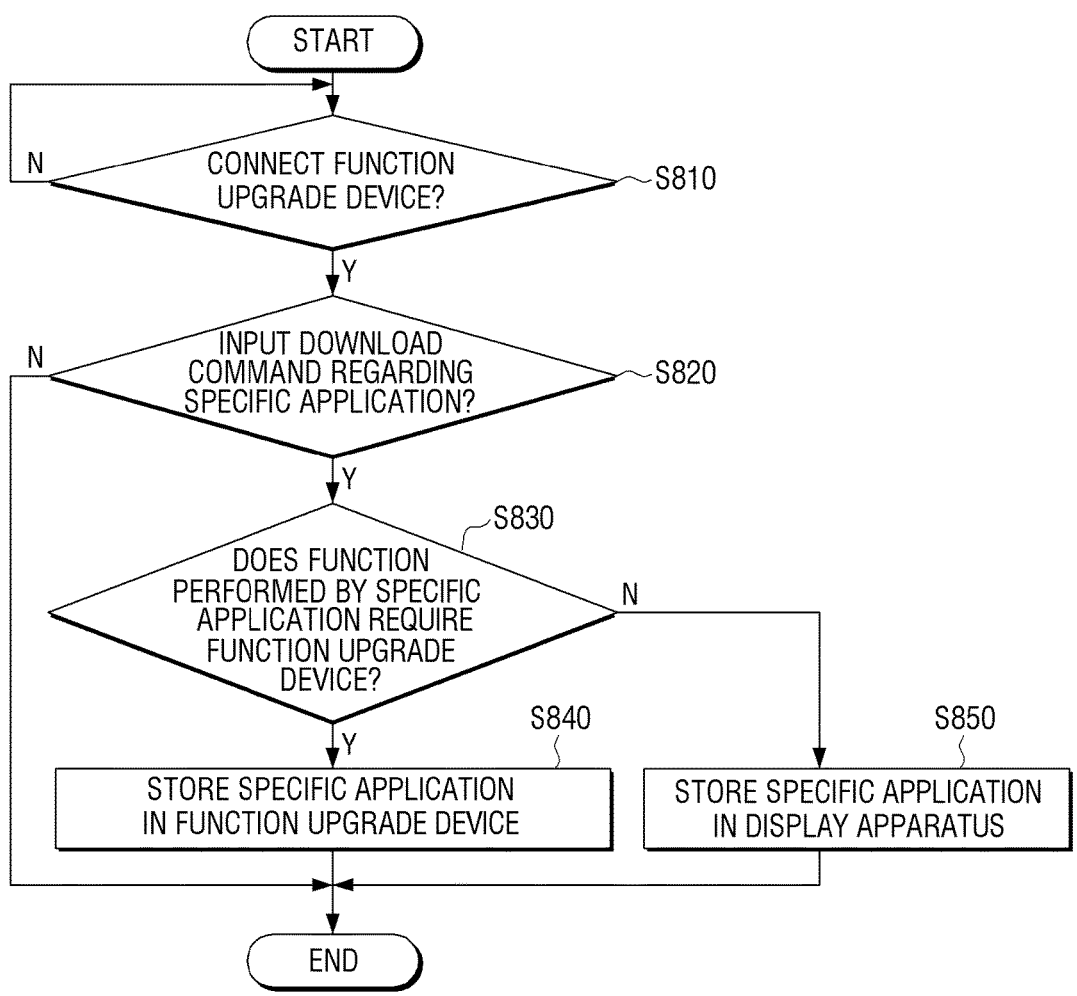
FIG. 8 is a flowchart provided to explain a method for downloading an application when a function upgrade device is installed in a display apparatus according to an exemplary embodiment.

FIG. 8 is a flowchart provided to explain a method for downloading an application when the function upgrade device 200 is installed in the display apparatus 100 according to an exemplary embodiment.

First, the display apparatus 100 determines whether the function upgrade device 200 is connected to the display apparatus 100 at operation S810. According to an exemplary embodiment, the display apparatus 100 and the function upgrade device 200 may be connected to each other through an interface module such as a USB interface, although are not limited thereto and may alternatively be connected through many other types of interfaces.

When the display apparatus 100 determines that the function upgrade device 200 is connected to the display apparatus 100 (operation S810-Y), the display apparatus 100 determines whether a command to download a specific application is input at operation S820.

When the display apparatus 100 determines that a command to download a specific command is input (operation S820-Y), the display apparatus 100 determines whether a function performed by the specific application is a function which requires the function upgrade device 200 at operation S830.

In response to determining that the function performed by the specific application is a function which requires the function upgrade device 200 (operation S830-Y), the display apparatus 100 stores the application in the function upgrade device 200 at operation S840. For example, if the function performed by the specific application is an application to perform a home gateway function, the display apparatus 200 may transmit the application to perform the home gateway function to the function upgrade device 200 so that the application can be stored in the function upgrade device 200.

On the other hand, in response to determining that the function performed by the specific application is not a function which requires the function upgrade device 200 (operation S830-N), the display apparatus 100 stores the application in the display apparatus at operation S840. For example, if the function performed by the specific application is a broadcast content search application, the display apparatus 200 may transmit the broadcast content search application to the storage 170.

As described above, in the case of an application which requires the function upgrade device 200 to perform a function, the display apparatus 100 stores the application in the function upgrade device 200. Thus, according to exemplary embodiments, a user may perform a function by using the application stored in the function upgrade device 200 without downloading the same application from another display apparatus 100.

The method for controlling a display apparatus according to various exemplary embodiments may be realized as a program and provided in the display apparatus. In addition, a non-transitory computer readable medium in which the program is stored may be provided according to exemplary embodiments. According to certain exemplary embodiments, the term non-transitory recordable medium refers to a medium which may store data semi-permanently, such as a register, a cache, and a memory, and may be readable by an apparatus. Specifically, the above-mentioned various applications or programs may be stored in a non-temporal recordable media such as a CD, a DVD, a hard disk, a Blu-ray disk, a USB, a memory card, and a ROM and provided therein.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A function upgrade device which is connectable to a display apparatus and configured to operate in conjunction with the display apparatus, the function upgrade device comprising:
    a function unit configured to perform a function in conjunction with the display apparatus, the display apparatus comprising a first processor configured to process data;
    a storage configured to store user information and an application related to the function unit;
    an interface configured to connect the function upgrade device to the display apparatus and enable the function upgrade device to communicate with the display apparatus;
    a controller configured to, when the display apparatus is connected to the function upgrade device through the interface, control the function unit to operate in conjunction with the display apparatus based on the user information and the application stored in the storage; and
    a second processor configured to process the data,
    wherein the controller is configured to selectively control one of the first processor or the second processor to perform the function and thereby process the data according to whether the first processor in the display apparatus performs the function, and
    wherein the controller is further configured to download and store the function in the storage of the function upgrade device in response to determining that the function, to be performed, requires the function upgrade device and to download and store the function in a storage of the display apparatus in response to determining that the function, to be performed, does not require the function upgrade device.

2. The function upgrade device as claimed in claim 1, wherein when the display apparatus is connected to the function upgrade device through the interface and user authentication is performed through the display apparatus, the controller is configured to control the interface to transmit the user information to the display apparatus.

3. The function upgrade device as claimed in claim 2, wherein the user information comprises display apparatus setting information,
    wherein the display apparatus is configured to change a setting of the display apparatus according to the display apparatus setting information transmitted from the function upgrade device.

4. The function upgrade device as claimed in claim 1, wherein the function to be performed in conjunction with the display apparatus is a game function, and the function unit comprises a graphic processor configured to perform the game function.

5. The function upgrade device as claimed in claim 1, wherein the function to be performed in conjunction with the display apparatus is a home gateway function, and the function unit comprises a communicator configured to communicate with a home device.

6. The function upgrade device as claimed in claim 1, wherein the function to be performed in conjunction with the display apparatus is a 5.1 channel audio output function, and the function unit comprises an audio processing module configured to process a 5.1 channel audio signal.

7. The function upgrade device as claimed in claim 1, wherein the function to be performed in conjunction with the display apparatus is a health management function, and the function unit comprises a sensor and a camera to check a heath condition of a user.

8. A method for controlling a display apparatus, the method comprising:
    performing user authentication when a function upgrade device is connected to the display apparatus;
    in response to authenticating a user based on the performing of the user authentication, receiving user information from the function upgrade device;
    changing a setting of the display apparatus based on the user information;
    in response to receiving a user command to perform a function of the display apparatus, determining whether the function corresponding to the user command is a function which, to be performed, requires the function upgrade device and generating a result of the determining,
    selectively controlling one of a first processor included in the display apparatus and a second processor included in the function upgrade device to perform the function corresponding to the user command according to the result, and downloading and storing the function corresponding to the user command in a storage of the function upgrade device in response to the result indicating that the function corresponding to the user command is a function which, to be performed, requires the function upgrade device, and downloading and storing the function corresponding to the user command in a storage of the display apparatus in response to the result indicating that the function corresponding to the user command is a function which, to be performed, does not require the function upgrade device.

9. The method as claimed in claim 8, wherein the performing comprises, when the result indicates that the function corresponding to the user command is a function which requires the function upgrade device, performing the function corresponding to the user command in conjunction with the function upgrade device, and when the result indicates that the function corresponding to the user command is not a function which requires the function upgrade device, performing the function corresponding to the user command independently by the display apparatus.

10. The method as claimed in claim 8, further comprising:
receiving a command to download an application;
determining whether a function to be performed by the application is a function which requires the function upgrade device and generating a determination result of the determining of whether the function to be performed by the application is a function which requires the function upgrade device; and
when the determination result indicates that the function to be performed by the application is a function which requires the function upgrade device, downloading, by the display apparatus, the application and storing the application in the function upgrade device, and when the determination result indicates that the function to be performed by the application is not a function which requires the function upgrade device, downloading, by the display apparatus, the application and storing the application in the display apparatus.

11. The method as claimed in claim 8, further comprising:
transmitting, by the display apparatus, usage history information of a user with respect to the display apparatus to the function upgrade device; and
storing, by the function upgrade device, the usage history information.

12. A display apparatus, comprising:
a first processor configured to process data;
a function unit configured to perform a function of the display apparatus;
an interface configured to connect the display apparatus to a function upgrade device comprising a second processor configured to process the data and enable the display apparatus to communicate with the function upgrade device; and
a controller configured to, when the function upgrade device is connected through the interface, control the function unit to receive user information from the function upgrade device by performing user authentication and change a setting of the display apparatus based on the user information, and when a user command to perform a function of the display apparatus is input, control the function unit to make a determination as to whether the function corresponding to the user command is a function which, to be performed, requires the function upgrade device and selectively control one of the first processor or the second processor to perform the function corresponding to the user command and thereby process the data according to the determination,
wherein the controller is further configured to download and store the function in a storage of the function upgrade device in response to the determination indicating that the function corresponding to the user command is a function which, to be performed, requires the function upgrade device and to download and store the function in a storage of the display apparatus in response to the determination indicating that the function corresponding to the user command is a function which, to be performed, does not require the function upgrade device.

13. The display apparatus as claimed in claim 12, wherein when the determination indicates that the function corresponding to the user command is a function which requires the function upgrade device, the controller controls the display apparatus to perform the function corresponding to the user command in conjunction with the function upgrade device, and when the determination indicates that the function corresponding to the user command is not a function which requires the function upgrade device, the controller controls the display apparatus to perform the function corresponding to the user command independently.

14. The display apparatus as claimed in claim 12, further comprising:
an input configured to receive user commands; and
the storage,
wherein when a command to download an application is input through the input, the controller is configured to determine whether a function to be performed by the application is a function which requires the function upgrade device, and when the controller determines that the function to be performed by the application is a function which requires the function upgrade device, the controller downloads and stores the application in the function upgrade device, and when the controller determines that the function to be performed by the application is not a function which requires the function upgrade device, the controller downloads and stores the application in the storage.

15. The display apparatus as claimed in claim 12, wherein the controller is configured to control the interface to transmit usage history information of a user with respect to the display apparatus to the function upgrade device,
wherein the function upgrade device is configured to store the usage history information.

16. A function upgrade device, comprising:
a first processor configured to process data; and
a controller configured to, when the function upgrade device is connected to a display apparatus comprising a second processor configured to process the data, make a determination as to whether a command to process data may be carried out independently by the second processor included in the display apparatus, and selectively use one of the first processor of the function upgrade device or the second processor of the display apparatus according to the determination to process the data according to the command, and
wherein the controller is further configured to download and store the function in a storage of the function upgrade device in response to the determination indicating that the command to process data cannot be carried out independently by the second processor in the dismay apparatus and to download and store the function in a storage of the display apparatus in response to the determination indicating that the command to process data can be carried out independently by the second processor in the display apparatus.

17. The function upgrade device as claimed in claim 16, wherein the first processor of the function upgrade device and the second processor of the display apparatus each comprise image processors, and the command comprises a command to process image data.

18. The function upgrade device as claimed in claim 16, further comprising an interface configured to connect the function upgrade device to the display apparatus.

19. The function upgrade device as claimed in claim 18, wherein the interface is implemented as a wireless interface.

20. The function upgrade device as claimed in claim 16, wherein in response to the determination indicating that the command to process data cannot be carried out independently by the second processor included in the display apparatus, the first processor of the function upgrade device processes the data according to the command.

* * * * *